United States Patent
Kato et al.

(10) Patent No.: US 9,819,207 B2
(45) Date of Patent: Nov. 14, 2017

(54) ALL SOLID STATE BATTERY SYSTEM

(71) Applicant: TOYOTA JIDOSHA KABUSHIKI KAISHA, Toyota-shi, Aichi-ken (JP)

(72) Inventors: Yuki Kato, Gotenba (JP); Takamasa Ohtomo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 14/808,602

(22) Filed: Jul. 24, 2015

(65) Prior Publication Data
US 2016/0043589 A1 Feb. 11, 2016

(30) Foreign Application Priority Data

Aug. 7, 2014 (JP) ................. 2014-161740

(51) Int. Cl.
*H02J 7/00* (2006.01)
*H01M 10/0525* (2010.01)
*H01M 10/0562* (2010.01)
*H01M 10/46* (2006.01)
*H01M 4/13* (2010.01)
(Continued)

(52) U.S. Cl.
CPC ............. *H02J 7/0063* (2013.01); *H01M 4/13* (2013.01); *H01M 10/058* (2013.01); *H01M 10/0525* (2013.01); *H01M 10/0562* (2013.01); *H01M 10/46* (2013.01); *H01M 10/44* (2013.01); *H01M 2004/021* (2013.01); *H01M 2300/0068* (2013.01); *Y02T 10/7011* (2013.01)

(58) Field of Classification Search
CPC .... H02J 7/0063; H01M 4/13; H01M 10/0525; H01M 10/0562; H01M 10/058; H01M 10/46; H01M 10/44; H01M 2004/021; H01M 2300/0068; Y02T 10/7011
USPC ......................................... 320/107
See application file for complete search history.

(56) References Cited

U.S. PATENT DOCUMENTS

2006/0063051 A1* 3/2006 Jang ................. H01M 4/36
429/406
2007/0105328 A1* 5/2007 Saito .................. H01M 4/0404
438/309
(Continued)

FOREIGN PATENT DOCUMENTS

JP 2009-093968 A 4/2009
JP 2009-146657 A 7/2009
(Continued)

*Primary Examiner* — Nathaniel Pelton
*Assistant Examiner* — Dung V Bui
(74) *Attorney, Agent, or Firm* — Oliff PLC

(57) ABSTRACT

Provided is an all solid state battery system with a high energy density. The all solid state battery system comprises an all solid state battery, and a discharging control unit that controls discharging of the all solid state battery, a cathode active material layer contains a cathode active material particle, and a sulfide solid electrolyte particle, and a ratio (T/t) of an actual thickness "T" of the cathode active material layer to an effective thickness "t" of the cathode active material layer which is calculated by the following Expression satisfies a relationship of $0.01 \leq T/t \leq 0.15$;

$t = V/i \times \kappa'$ (in which, V represents an operation voltage width (V), i represents a current density (mA/cm²) during discharging, and κ' represents effective Li ion conductivity (S/cm) of the cathode active material layer).

2 Claims, 3 Drawing Sheets

(51) Int. Cl.
*H01M 10/058* (2010.01)
*H01M 10/44* (2006.01)
*H01M 4/02* (2006.01)

(56) References Cited

U.S. PATENT DOCUMENTS

| | | | | |
|---|---|---|---|---|
| 2010/0178554 A1* | 7/2010 | Hama | ............... | H01M 2/02 |
| | | | | 429/185 |
| 2011/0165466 A1* | 7/2011 | Zhamu | ............... | B82Y 30/00 |
| | | | | 429/231.8 |
| 2012/0070746 A1* | 3/2012 | Mikhaylik | ............... | H01M 2/1673 |
| | | | | 429/231.95 |
| 2013/0142943 A1* | 6/2013 | Kubo | ............... | H01M 4/1397 |
| | | | | 427/58 |
| 2013/0171526 A1* | 7/2013 | Miki | ............... | H01M 4/0471 |
| | | | | 429/231.1 |
| 2014/0125291 A1 | 5/2014 | Hama et al. | | |
| 2014/0154584 A1 | 6/2014 | Nagase et al. | | |

FOREIGN PATENT DOCUMENTS

| | | |
|---|---|---|
| JP | 2013-055036 A | 3/2013 |
| JP | 2014-130733 A | 7/2014 |
| KR | 2014-0014257 A | 2/2014 |

* cited by examiner

ALL SOLID STATE BATTERY SYSTEM

TECHNICAL FIELD

The present invention relates to an all solid state battery system with a high energy density.

BACKGROUND ART

Along with the rapid distribution of information-related equipment and communication equipment such as personal computers, video cameras, and mobile telephones in recent years, the development of batteries that are utilized as electric power sources thereof has been considered important. Furthermore, the development of high output power and high capacity batteries for electric vehicles or hybrid vehicles is in progress in the field of automobile industry and the like as well. Currently, among various batteries, lithium batteries are attracting attention because of its high energy densities.

In regard to the lithium batteries that are currently available in the market, since liquid electrolytes including flammable organic solvents are used, installation of safety devices that suppress temperature increase at the time of short circuits, and devices for preventing short circuits are needed. Meanwhile, since lithium batteries that have been produced into all solid state batteries by converting the liquid electrolyte to a solid electrolyte layer do not use flammable organic solvents in the batteries, it is contemplated that simplification of safety devices can be promoted, and the lithium batteries are excellent in view of the production cost and productivity.

As a solid electrolyte that can be used in the all solid lithium battery, a sulfide solid electrolyte is known. For example, Patent Literature 1 discloses a sulfide-based solid battery in which an anode active material layer contains anode active material fine particles and sulfide-based solid electrolyte fine particles, and a ratio ($r_a/r_s$) of an average particle size ($r_a$) of the anode active material fine particles to an average particle size ($r_s$) of the sulfide-based solid electrolyte fine particles is 2.0 or greater. An object of this technology is to provide a sulfide-based solid battery having high charging and discharging capacity with respect to charging and discharging, particularly, under high current density conditions.

CITATION LIST

Patent Literature

Patent Literature 1: Japanese Patent Application Laid-Open No. 2013-055036

SUMMARY OF INVENTION

Technical Problem

A high energy density of a battery has been demanded. The invention has been made in consideration of the above-described problem, and a main object thereof is to provide an all solid state battery system with a high energy density.

Solution to Problem

To solve the above-described problem, the present inventors have made a thorough investigation, and as a result, they obtained the following finding, in which when the effective thickness "t" of a cathode active material layer is defined on the basis of a physical property value (effective Li ion conductivity of the cathode active material layer) of the cathode active material layer and a desired value of a load (an operation voltage width, a current density), and then the actual thickness "T" of the cathode active material layer is adjusted in accordance with the effective thickness "t", the performance of the cathode active material and the solid electrolyte can be sufficiently withdrawn. The present inventors have accomplished the invention on the basis of the finding.

That is, according to an aspect of the invention, there is provided: an all solid state battery system comprising: an all solid state battery including a cathode active material layer, an anode active material layer, and a solid electrolyte layer that is formed between the cathode active material layer and the anode active material layer; and a discharging control unit that controls discharging of the all solid state battery, wherein the cathode active material layer contains a cathode active material particle, and a sulfide solid electrolyte particle, and a ratio (T/t) of an actual thickness "T" of the cathode active material layer to an effective thickness "t" of the cathode active material layer which is calculated by the following Expression satisfies a relationship of $0.01 \leq T/t \leq 0.15$;

$$T = V/i \times \kappa'$$

(in which, V represents an operation voltage width (V), i represents a current density (mA/cm$^2$) during discharging, and κ' represents effective Li ion conductivity (S/cm) of the cathode active material layer).

According to the invention, the value of T/t is within a specific range, and thus it is possible to attain an all solid state battery system with a high energy density.

In the invention, it is preferable that the ratio (T/t) satisfies a relationship of $0.04 \leq T/t \leq 0.15$.

Advantageous Effects of Invention

According to the all solid state battery system of the invention, it is possible to attain an effect of a high energy density.

DESCRIPTION OF EMBODIMENTS

Hereinafter, an all solid state battery system of the invention will be described in detail.

Figure 1:
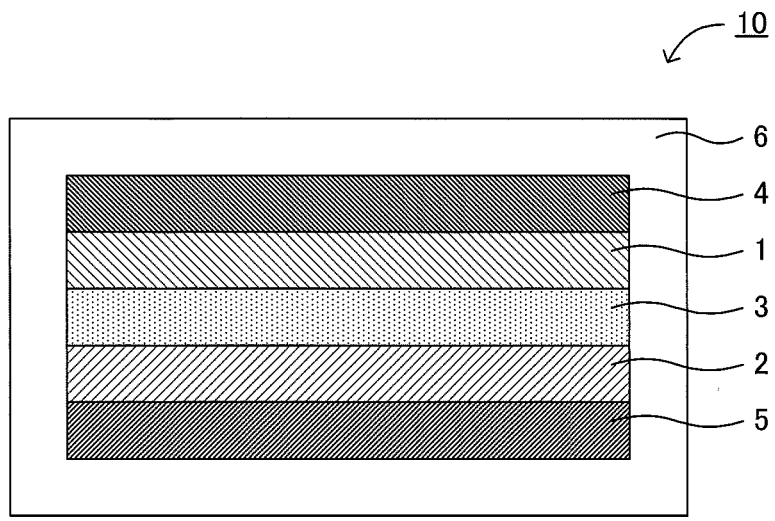
FIG. 1 is a schematic cross-sectional view illustrating an example of an all solid state battery according to the invention.

FIG. 1 is a schematic cross-sectional view illustrating an example of an all solid state battery according to the invention. An all solid state battery 10 illustrated in FIG. 1 comprises a cathode active material layer 1, an anode active material layer 2, a solid electrolyte layer 3 that is formed between the cathode active material layer 1 and the anode active material layer 2, a cathode current collector 4 that performs current collection of the cathode active material layer 1, an anode current collector 5 that performs current collection of the anode active material layer 2, and a battery case 6 that accommodates these members. In addition, although not illustrated in the drawing, the cathode active material 1 contains cathode active material particles, and sulfide solid electrolyte particles. In the cathode active material layer 1, a ratio (T/t) of the actual thickness "T" to the effective thickness "t" is within a specific range.

Figure 2:
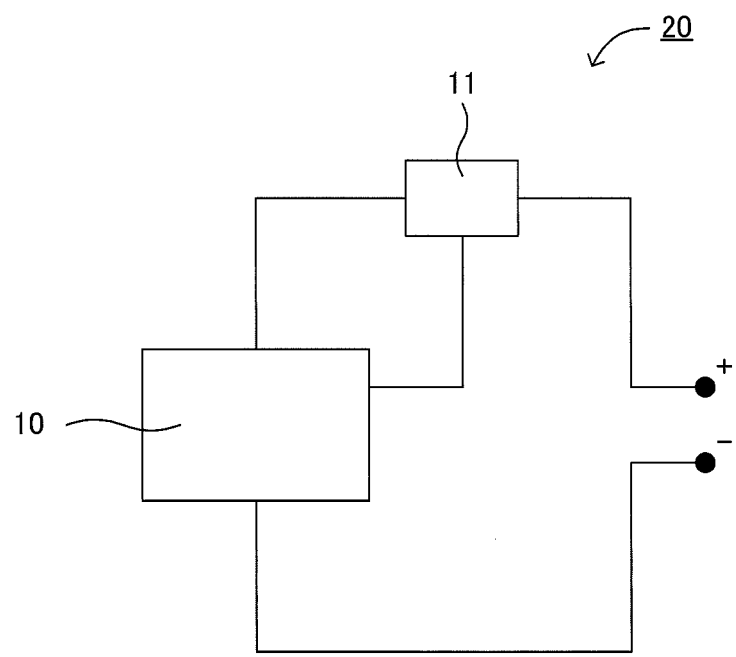
FIG. 2 is a schematic view illustrating an example of the all solid state battery system according to the invention.

FIG. 2 is a schematic view illustrating an example of the all solid state battery system of the invention. An all solid state battery system 20 illustrated in FIG. 2 comprises the all solid state battery 10, and a discharging control unit 11 that controls discharging of the all solid state battery 10.

According to the invention, since the value of T/t is within the specific range, it is possible to attain an all solid state battery system with a high energy density. In the invention, the effective thickness "t" of the cathode active material layer is defined on the basis of a physical property value (effective Li ion conductivity of the cathode active material layer) and a desired value of a load (an operation voltage width, a current density), and then the actual thickness "T" of the cathode active material layer is adjusted in accordance with the effective thickness "t". This finding is a new finding that is not disclosed in the related art. In addition, in the invention, the range of T/t is in a very limited range, and thus a desired effect is obtained.

Hereinafter, description will be given of the all solid state battery system of the invention for each configuration.

1. All Solid State Battery

The all solid state battery in the invention includes at least a cathode active material layer, an anode active material layer, and a solid electrolyte layer.

(1) Cathode Active Material Layer

In the invention, the effective thickness "t" of the cathode active material layer is defined by the following Expression (1).

$$t = V/i \times \kappa'$$  Expression (1)

(in which, V represents an operation voltage width (V), i represents a current density (mA/cm$^2$) during discharging, and $\kappa'$ represents effective Li ion conductivity (S/cm) of the cathode active material layer).

Figure 3:
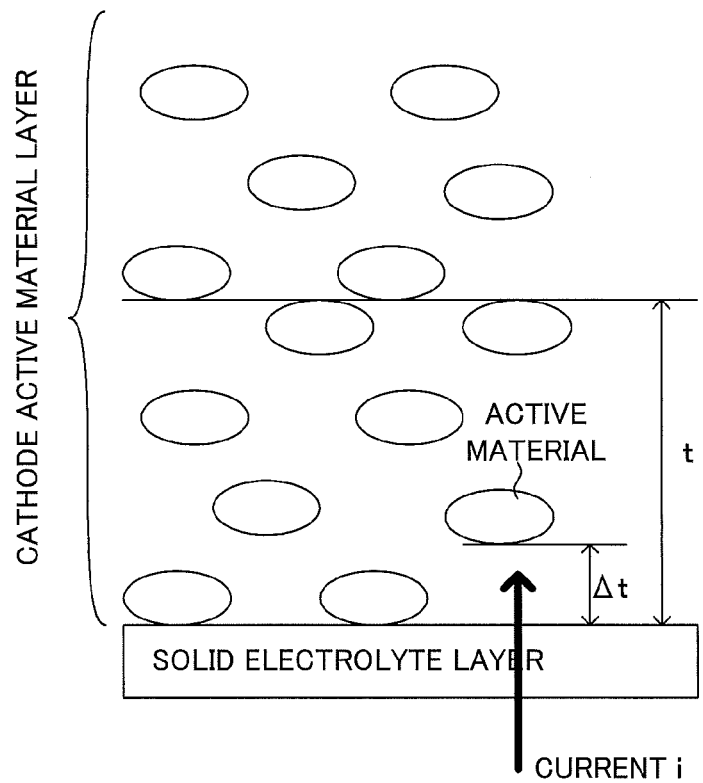
FIG. 3 is a schematic view illustrating the effective thickness of a cathode active material layer.

Details of Expression (1) will be described with reference to FIG. 3. As illustrated in FIG. 3, during discharging, Li ions corresponding to a current "i" flow into the cathode active material layer from a solid electrolyte layer side. As a movement resistance of the Li ions, generally, an ohmic resistance, a concentration distribution resistance, and a resistance due to convection may be exemplified. However, in the case of using an inorganic solid electrolyte, the concentration distribution resistance and the resistance due to the convection do not occur, and thus the movement of the Li ions in the cathode active material layer is dominated by only the ohmic resistance.

As illustrated in FIG. 3, voltage drop of $\Delta V = \Delta R \times i$ per unit area occurs until the Li ions move from the solid electrolyte layer to an active material that is located at a position of $\Delta t$. In addition, from a relationship of $\Delta R = \rho \times \Delta t = (1/\kappa') \times \Delta t$ ($\rho$ represents resistivity, $\kappa'$ represents effective Li ion conductivity of the cathode active material layer), a relationship of $\Delta V = (i/\kappa') \times \Delta t$ is obtained.

In a case where an operation voltage width V of a battery is defined, with regard to the maximum thickness "t" of the cathode active material layer at which Li ions theoretically operate in the voltage, a relationship of $t = V/i \times \kappa'$ is established from a relationship of $V = (i/\kappa') \times t$. In a case where the operation voltage width V is defined, the Li ions cannot move to a distance that is longer than "t", and thus an ineffective region as a battery is present. In the invention, "t", which is defined from the operation voltage width V, the current density "i", and the effective Li ion conductivity $\kappa'$ of the cathode active material layer, is defined as a thickness (effective thickness) at which the cathode active material particles in the range of "t" can theoretically operate. Incidentally, the effective thickness "t" is a value obtained by converting an ion conduction potential of the cathode active material layer to a thickness. Actually, the Li ions also move along an interface of particles in addition to movement in a thickness direction, and thus the effective thickness "t" can also be grasped as a distance over which the Li ions can move at the operation voltage width V.

Figure 4:
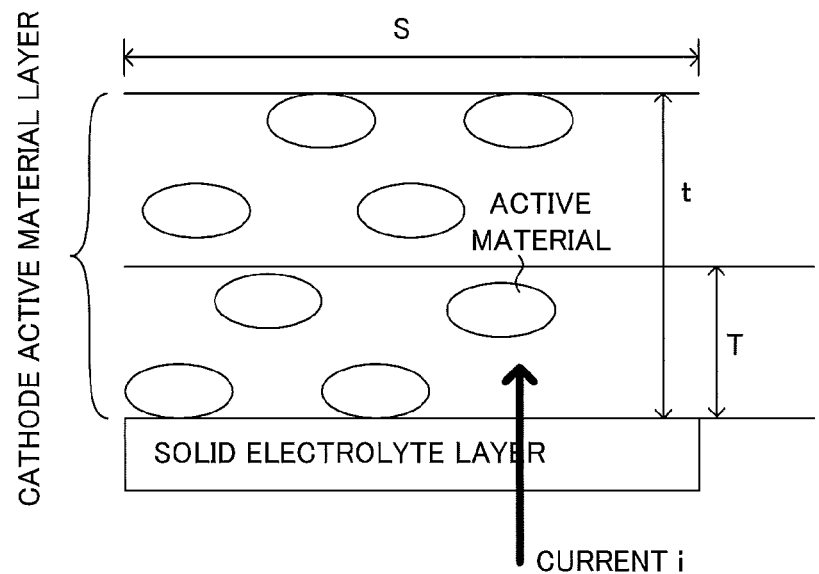
FIG. 4 is a schematic view illustrating the effective thickness and the actual thickness of the cathode active material layer.

In addition, as illustrated in FIG. 4, it is assumed that when discharging to the cathode active material layer having an actual thickness "T" and a cross-sectional area S occurs under conditions of operation voltage width V and the current density "i", discharging capacity $\rho_0$ is obtained. In this case, an effective capacity density $\rho$ can be obtained by standardizing the discharging capacity $\rho_0$ with a volume (TS) of the cathode active material layer ($\rho = \rho_0/TS$). In the invention, it is possible to evaluate an energy density with the effective capacity density. As described in the following Examples, for example, a substantial energy density of a battery can be evaluated with capacity (effective capacity density) that is capable of being output at a constant current density. Particularly, in the case of allowing the battery to operate at a constant current density, an improvement in the effective capacity density is very important.

The present inventors have found that a constant relationship is established between a ratio (T/t) of the actual thickness "T" to the effective thickness "t", and the effective capacity density. Specifically, they have found that when the value of T/t is in a specific range, the performance of an electrolyte or an active material is sufficiently withdrawn, and thus the effective capacity density is significantly improved. Incidentally, the effective thickness "t" is calculated on the basis of the effective Li ion conductivity $\kappa'$ of the cathode active material layer. The effective Li ion conductivity $\kappa'$ of the cathode active material layer is a value on which effects of the ion conductivity, a particle size, and a ratio of a solid electrolyte are reflected, and thus it can be said that the value of T/t is a value in which these parameters are comprehensively considered.

Although not particularly limited, the value of the operation voltage width V in Expression (1) is, for example, 0.2 V or greater, and is preferably 0.5 V or greater. On the other hand, the value of the operation voltage width V is, for example, 5 V or less, and is preferably 4 V or less. In addition, although not particularly limited, the value of the current density "i" in Expression (1) is, for example, 0.001 mA/cm$^2$ or greater. It is preferable that the value of the current density "i" be 0.005 mA/cm$^2$ or greater, and more preferably 0.01 mA/cm$^2$ or greater. On the other hand, the value of the current density "i" is, for example, 2000 mA/cm$^2$ or less, and is preferably 1000 mA/cm$^2$ or less.

In Expression (1), the effective Li ion conductivity $\kappa'$ of the cathode active material layer can be obtained by the following method. As a first method, a method, in which both surfaces of the cathode active material layer are pinched by an electron blocking electrode and impedance measurement is performed, may be exemplified. As a second method, a volume fraction $\epsilon$ of the solid electrolyte is obtained from a composition ratio of the cathode active material layer or a cross-section observation image, and the effective Li ion conductivity $\kappa'$ can be obtained from a relationship of $\kappa'=\kappa\times\epsilon^{1.5}$ by using the ion conductivity $\kappa$ of the solid electrolyte. For example, this relationship is described in J. Electrochem. Soc. 1993, Volume 140, Issue 6, Pages 1526-1533, J. Electrochem. Soc. 1994, Volume 141, Issue 1, Pages 1-10, Advances in Electrochemistry Electrochemical Engineering, Vol. 2, p. 15, C. W. Tobias, Editor, Interscience (1962), J. Newman and W. Tiedemann, AIChE J., 21, 25(1975). Although not particularly limited, it is preferable that a value of the effective Li ion conductivity $\kappa'$ of the cathode active material layer be, for example, $1\times10^{-4}$ S/cm or greater.

On the other hand, the actual thickness "T" of the cathode active material layer may be measured by a film thickness measuring device, or may be calculated from a cross-section observation image of the cathode active material layer. For example, the value of T/t is 0.01 or greater, and is preferably 0.04 or greater. The reason for the preference is that an improvement in the energy density can be attained. On the other hand, the value of T/t is, for example, 0.15 or less. It is preferable that the value be 0.13 or less, and more preferably 0.11 or less. Incidentally, when the actual thickness "T" of the cathode active material layer is smaller than the effective thickness "t", the effective capacity density is maximized. The reason for the maximization is considered to be because a distribution of the cathode active material particles is not completely uniform in the cathode active material layer, and cracking or fracture is present inside the cathode active material layer at a constant probability. In addition, the actual thickness "T" of the cathode active material layer is determined depending on the effective thickness "t". For example, the actual thickness "T" is 20 μm or greater, and is preferably 25 μm or greater. On the other hand, the actual thickness "T" is, for example, 2000 μm or less, and is preferably 1500 μm or less.

(i) Cathode Active Material Particles

The cathode active material particles in the invention are not particularly limited as long as Li ions can be inserted into the particles. Examples of the cathode active material particles include an oxide active material, and specific examples thereof include a rock salt bed type active material such as $LiCoO_2$, $LiMnO_2$, $LiNiO_2$, $LiVO_2$, and $LiNi_{1/3}Co_{1/3}Mn_{1/3}O_2$, a spinel type active material such as $LiMn_2O_4$ and $Li(Ni_{0.5}Mn_{1.5})O_4$, and an olivine type active material such as $LiFePO_4$, $LiMnPO_4$, $LiNiPO_4$, and $LiCuPO_4$.

For example, an average particle size ($D_{50}$) of the cathode active material particles is in a range of 1 μm to 50 μm. It is preferable that the average particle size ($D_{50}$) of the cathode active material be in a range of 1 μm to 20 μm, and more preferably 1 μm to 10 μm.

In addition, the surface of the cathode active material particles may be coated with a coating layer. The reason for this configuration is that when the coating layer is provided, it is possible to suppress reaction between the cathode active material particles and the sulfide solid electrolyte particles. Examples of a material of the coating layer include a Li ion conductive oxide such as $LiNbO_3$, $Li_3PO_4$, and LiPON. For example, it is preferable that the average thickness of the coating layer be in a range of 1 nm to 20 nm, and more preferably 1 nm to 10 nm.

(ii) Sulfide Solid Electrolyte Particles

The sulfide solid electrolyte particles in the invention are particles having Li ion conductivity. The sulfide solid electrolyte particles contain at least a Li element and an S element. It is preferable that the sulfide solid electrolyte particles further contain at least one element of a P element, a Ge element, and a Si element. In addition, the sulfide solid electrolyte particles may be glass (sulfide glass), crystallized glass (glass ceramics), or a crystalline material. In addition, the cathode active material layer may contain a kind of sulfide solid electrolyte particles, or may contain two or more kinds of sulfide solid electrolyte particles.

Examples of the sulfide solid electrolyte particles include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (in which, "m" and "n" represent a positive number, and Z represents any one of Ge, Zn, and Ga), $Li_2S$—$GeS_2$, $Li_2S$—$SiS_2$—$Li_3PO_4$, and $Li_2S$—$SiS_2$—$Li_xMO_y$ (in which, "x" and "y" represent a positive number, and M represents any one of P, Si, Ge, B, Al, Ga, and In).

Particularly, the sulfide solid electrolyte particles in the invention contain an $M_1$ element, an $M_2$ element, and the S element. $M_1$ is at least one kind selected from the group consisting of Li, Na, K, Mg, Ca, and Zn. $M_2$ is at least one kind selected from the group consisting of P, Sb, Si, Ge, Sn, B, Al, Ga, In, Ti, Zr, V, and Nb. A peak is exhibited at a position of $2\theta=29.58°\pm0.50°$ in X-ray diffraction measurement using CuKα-ray, and a peak is not exhibited at a position of $2\theta=27.33°\pm0.50°$ in X-ray diffraction measurement using CuKα-ray. In the case where the peak is exhibited at the position of the position of $2\theta=27.33°\pm0.50°$, it is preferable that a ratio ($I_B/I_A$) of diffraction intensity $I_B$ of the peak at $2\theta=27.33°\pm0.50°$ to diffraction intensity $I_A$ of the peak at $2\theta=29.58°\pm0.50°$ be less than 0.50. The sulfide solid electrolyte particles are referred to as sulfide solid electrolyte particles A.

The sulfide solid electrolyte particles A have a peak at the position of $2\theta=29.58°\pm0.50°$ in X-ray diffraction measurement using CuKα-ray. This crystalline phase is referred to as crystalline phase A. The crystalline phase A has very high ion conductivity. Typically, the crystalline phase A has peaks at positions of $2\theta=17.38°$, $20.18°$, $20.44°$, $23.56°$, $23.96°$, $24.93°$, $26.96°$, $29.07°$, $29.58°$, $31.71°$, $32.66°$, and $33.39°$. Incidentally, these positions may be slightly moved in a range of $\pm0.50°$.

The sulfide solid electrolyte particles A may not have a peak or may slightly have a peak at a position of $2\theta=27.33°\pm0.50°$ in the X-ray diffraction measurement using CuKα-ray. The crystalline phase is referred to as a crystalline phase B. The crystalline phase B has ion conductivity lower than that of the crystalline phase A. Typically, the crystalline phase B has peaks at positions of $2\theta=17.46°$, $18.12°$, $19.99°$, $22.73°$, $25.72°$, $27.33°$, $29.16°$, and $29.78°$. Incidentally, these peak positions may also be slightly moved in a range of $\pm0.50°$.

In addition, when diffraction intensity of a peak (peak in the vicinity of $2\theta=29.58°$) of the crystalline phase A is referred to as $I_A$, and diffraction intensity of a peak (peak in the vicinity of $2\theta=27.33°$) of the crystalline phase B is referred to as $I_B$, for example, a value of $I_B/I_A$ is less than 0.50. It is preferable that this value be 0.45 or less, more preferably 0.25 or less, still more preferably 0.15 or less, and still more preferably 0.07 or less. In addition, the value of $I_B/I_A$ is preferably 0. In other words, it is preferable that the sulfide solid electrolyte particles B do not have a peak in the vicinity of $2\theta=27.33°$.

It is preferable that the sulfide solid electrolyte particles A have a composition of $Li_{(4-x)}Ge_{(1-x)}P_xS_4$ ("x" satisfies a relationship of 0<x<1). Here, $Li_{(4-x)}Ge_{(1-x)}P_xS_4$ corresponds to a composition of a solid-solution of $Li_3PS_4$ and $Li_4GeS_4$. That is, this composition corresponds to a composition on a tie line of $Li_3PS_4$ and $Li_4GeS_4$. Incidentally, any one of $Li_3PS_4$ and $Li_4GeS_4$ corresponds to an ortho-composition, and has an advantage in that chemical stability is high.

In addition, it is preferable that the sulfide solid electrolyte particles in the invention include an ion conductor having a $PS_4^{3-}$ structure and substantially do not include $Li_2S$ and cross-linking sulfur. The sulfide solid electrolyte particles are referred to as sulfide solid electrolyte particles B. For example, a ratio of the $PS_4^{3-}$ structure is 50% by mole or greater on the basis of the entirety of the anion structure of the ion conductor. It is preferable that this ratio be 60% by mole or greater, more preferably 70% by mole or greater, still more preferably 80% by mole or greater, and still more preferably 90% by moles or greater. Incidentally, the ratio of the $PS_4^{3-}$ structure may be determined by Raman spectroscopy, NMR, XPS, and the like.

The sulfide solid electrolyte particles B substantially do not include $Li_2S$, and thus it is possible to decrease an amount of hydrogen sulfide that is generated. $Li_2S$ is likely to react with water, and thus hydrogen sulfide tends to occur. A composition in which "$Li_2S$ is substantially not included" can be confirmed with X-ray diffraction. Specifically, it is preferable not to have a peak (2θ=27.0°, 31.2°, 44.8°, 53.1°) of $Li_2S$.

The sulfide solid electrolyte particles B substantially do not include cross-linking sulfur, and thus it is possible to decrease an amount of hydrogen sulfide that is generated. Examples of the "cross-linking sulfur" include cross-linking sulfur having an $S_3P$—S—$PS_3$ structure obtained through a reaction between $Li_2S$ and $P_2S_5$. The cross-linking sulfur is likely to react with water, and the hydrogen sulfide tends to occur. In addition, a composition in which "cross-linking sulfur is substantially not contained" can be confirmed through measurement of Raman spectral spectrum. For example, a peak of the $S_3P$—S—$PS_3$ structure is typically shown at 402 $cm^{-1}$. Accordingly, it is preferable that this peak not be detected. In addition, a peak of the $PS_4^{3-}$ structure is typically shown at 417 $cm^{-1}$. It is preferable that intensity $I_{402}$ at 402 $cm^{-1}$ be smaller than intensity $I_{417}$ at 417 $cm^{-1}$. More specifically, it is preferable that the intensity $I_{402}$ be, for example, 70% or less of the intensity $I_{417}$, more preferably 50% or less, and still more preferably 35% or less.

The sulfide solid electrolyte particles B may contain LiX (X is at least one kind of F, Cl, Br, and I) in addition to the ion conductor. For example, a ratio of LiX is 5% by mole or greater. It is preferable that the ratio be 10% by mole or greater, and more preferably 20% by mole or greater. On the other hand, the ratio of LiX is, for example, 35% by mole or less, and is preferably 30% by mole or less.

It is preferable that the sulfide solid electrolyte particles B have a composition of xLiX·(100-x) (y$Li_2S$·(1-y) $P_2S_5$) (5≤x≤35, 0.7≤y≤0.8). Incidentally, it is preferable that "y" be 0.72 or greater, and more preferably 0.74 or greater. In addition, it is preferable that "y" be 0.78 or less, and more preferably 0.76 or less.

In addition, in the invention, an average particle size ($D_{50}$) of the sulfide solid electrolyte particles is, for example, in a range of 0.1 μm to 50 μm. It is preferable that $D_{50}$ be in a range of 0.1 μm to 20 μm, and more preferably in a range of 0.1 μm to 10 μm. In addition, it is preferable that the sulfide solid electrolyte particles have high ion conductivity. For example, the ion conductivity of the sulfide solid electrolyte particles at 25° is $1×10^{-4}$ S/cm or greater, and is preferably $1×10^{-3}$ S/cm or greater.

In addition, as described above, the sulfide solid electrolyte particles may be glass (sulfide glass), crystallized glass (glass ceramics), or a crystalline material. Examples of a method of manufacturing the sulfide glass include a method in which a raw material mixture is subjected to amorphization. Examples of the amorphization method include a mechanical milling method, and a melting and rapid cooling method. Examples of the mechanical milling method include a ball mill and a vibration mill. Examples of a method of manufacturing the glass ceramics include a method in which the sulfide glass is subjected to a heat treatment. Examples of a method of manufacturing the crystalline material include a method (solid phase reaction method) in which the raw material mixture is subjected to a heat treatment.

(iii) Cathode Active Material Layer

The cathode active material layer in the invention may contain only the cathode active material particles and the sulfide solid electrolyte particles, or may further contain other materials. Examples of other materials include a conductive material and a binding material.

When the conductive material is added to the cathode active material layer, it is possible to improve electron conduction of the cathode active material layer. Examples of the conductive material include acetylene black, Ketjen black, and carbon fiber. In addition, when a binding material is added to the cathode active material layer, it is possible to improve moldability of the cathode active material layer. Examples of the binding material include a fluorine-containing binding material such as polyvinylidene fluoride (PVDF).

(2) Anode Active Material Layer

The anode active material layer in the invention is a layer that contains at least an anode active material, and may further contain at least one of a solid electrolyte material, a conductive material, and a binding material as necessary. Particularly, in the invention, examples of the anode active material include a metal active material, and a carbon active material. Examples of the metal active material include In, Al, Si, and Sn. On the other hand, examples of the carbon active material include mesocarbon microbeads (MCMB), high orientation property graphite (HOPG), hard carbon, and soft carbon.

Incidentally, the solid electrolyte material, the conductive material, and the binding material which can be used in the anode active material layer are the same as those in the description relating to the cathode active material layer. In addition, it is preferable that the thickness of the anode active material layer is, for example, in a range of 0.1 μm to 1000 μm.

(3) Solid Electrolyte Layer

The solid electrolyte layer in the invention is a layer that is formed between the cathode active material layer and the anode active material layer. Although not particularly limited, examples of the solid electrolyte material that is used in the solid electrolyte layer include an inorganic solid electrolyte material such as a sulfide solid electrolyte material and an oxide solid electrolyte material. As the sulfide solid electrolyte material, for example, the same material as the sulfide solid electrolyte particles may be used.

In addition, the solid electrolyte layer may contain only the solid electrolyte material, or may further contain other materials. Examples of other materials include a binding material. The binding material is the same as that disclosed in the description relating to the cathode active material layer. It is preferable that the thickness of the solid electrolyte layer be, for example, in a range of 0.1 μm to 1000 μm.

(4) Other Configurations

The all solid state battery of the invention comprises at least the cathode active material layer, the anode active material layer, and the solid electrolyte layer. In addition, typically, the all solid state battery comprises a cathode current collector that performs current collection of the cathode active material layer, and an anode current collector that performs current collection of the anode active material layer. Examples of a material of the cathode current collector include SUS, aluminum, nickel, iron, titanium, and carbon. On the other hand, examples a material of the anode current collector include SUS, copper, nickel, and carbon. In addition, it is preferable to appropriately select the thickness, the shape, and the like of the cathode current collector and the anode current collector in accordance with factors such as a use of the all solid state battery. In addition, as the battery case that is used in the invention, a battery case of a typical all solid state battery can be used. Examples of the battery case include an SUS battery case.

(5) All Solid State Battery

The all solid state battery of the invention may be a primary battery or a secondary battery, and the secondary battery is preferable. The reason for the preference is that repetitive charging and discharging are possible, and the secondary battery is useful, for example, as an in-vehicle battery. Examples of the shape of the all solid state battery of the invention include a coin type, a laminate type, a cylinder type, and a square type. In addition, the method of manufacturing an all solid state battery of the invention is not particularly limited as long as the above-described all solid state battery can be obtained, and it is possible to use the same method as a method of manufacturing a typical all solid state battery. Examples of the method of manufacturing the all solid state battery include a method in which a material that constitutes the cathode active material layer, a material that constitutes the solid electrolyte layer, and a material that constitutes the anode active material layer are sequentially pressed to manufacture a power generating element, the power generating element is accommodated inside the battery case, and the battery case is caulked.

2. Discharging Control Unit

The discharging control unit in the invention is to control discharging of the all solid state battery. Specifically, the control is performed in such a manner that the operation voltage width becomes V (V), and the current density becomes "i" (mA/cm$^2$). The current density may be constant or variable. In the case of the latter, the average (average in consideration of time) of the current density may be defined as "i". In addition, although not particularly limited, examples of the configuration of the discharging control unit include a configuration having a measurement unit that measures a potential of the cathode active material layer, a resistor unit that adjusts a current density, and a switch unit that shut off a current of a battery in accordance with the potential of the cathode active material layer.

Incidentally, the present invention is not intended to be limited to the embodiment described above. The embodiment described above is given only for illustrative purposes, and any embodiment having substantially the same configuration as the technical idea described in the claims of the present invention and provides similar operating effects, is construed to be included in the technical scope of the present invention.

EXAMPLES

Hereinafter, the present invention will be described more specifically by way of Examples.

Example 1

(Manufacturing of Sulfide Solid Electrolyte Particles)

As starting raw material, lithium sulfide (Li$_2$S manufactured by Nippon Chemical Industrial Co., LTD.), diphosphorus pentasulfide (P$_2$S$_5$ manufactured by Sigma-Aldrich Co. LLC.), and germanium sulfide (GeS$_2$ manufactured by JAPAN PURE CHEMICAL CO., LTD.) were used. Powders of these were mixed in a glove box set to an argon atmosphere in a ratio in which Li$_2$S was set to 0.7811 g, P$_2$S$_5$ was set to 0.7329 g, and GeS$_2$ was set to 0.4860 g. Put into a container (45 cc, formed from ZrO$_2$) of a planetary ball mill was 1 g of the resultant mixture, ZrO$_2$ balls (($\phi$=10 mm, 10 pieces) were put into the container, and then the container was completely closed (argon atmosphere). The container was mounted on a planetary ball milling machine (P7™ manufactured by Fritsch Japan Co., Ltd.), and mechanical milling was performed at the table rotation number of 370 rpm for 40 hours. According to this, an amorphous ion conductive material was obtained. Next, a powder of the ion conductive material that was obtained was put into a quartz tube coated with carbon, and was vacuum sealed. A pressure of the quartz tube that was vacuum sealed was approximately 30 Pa. Next, the quartz tube was provided in a baking furnace, and a temperature was raised from room temperature to 700° C. for 6 hours, retention was performed at 700° C. for 8 hours, and then the quartz tube was gradually cooled down to room temperature. According to this, sulfide solid electrolyte particles (glass ceramics) having a composition of Li$_{3.35}$Ge$_{0.35}$P$_{0.65}$S$_4$ were obtained. Incidentally, the sulfide solid electrolyte particles correspond to the above-described sulfide solid electrolyte particles A.

(Manufacturing of Evaluation Battery 1)

The sulfide solid electrolyte particles (D$_{50}$=1 μm) that was obtained, a cathode active material (LiCoO$_2$, D$_{50}$=5 μm, manufactured by TODAKOGYO CORP.), and a conductive material (VGCF, D$_{50}$=1 μm) were prepared. Mixing was performed in a ratio in which the sulfide solid electrolyte particles were set to 304.2 mg, the cathode active material was set to 180.7 mg, and the conductive material was set to 15.1 mg, thereby obtaining a cathode mix. In addition, mixing was performed in a ratio in which the sulfide solid electrolyte particles were set to 250 mg, and the anode active material was set to 250 mg, thereby obtaining an anode mix.

Put into a cylinder (manufactured by Macol) having a cross-sectional area of 1 cm$^2$ was 65 mg of the sulfide solid electrolyte particles (sulfide glass having a composition of 20LiI.80(0.75Li$_2$S.0.25P$_2$S$_5$)) and it was pressed therein at 100 MPa, thereby forming the solid electrolyte layer. Next, 140 mg of the anode mix was put on one surface of the solid electrolyte layer, and was pressed at 100 MPa, thereby forming an anode active material layer. Subsequently, 8 mg of the cathode mix was put on the other surface of the solid electrolyte layer and was pressed at 350 MPa, thereby forming the anode active material layer. In this manner, Evaluation Battery 1 was obtained.

Examples 2 to 4, Comparative Example 1

Evaluation Batteries 1 were obtained in the same manner as Example 1 except that an amount of the cathode mix was changed to a value illustrated in Table 2.

Comparative Example 2

(Manufacturing of Sulfide Solid Electrolyte Particles)

As starting raw material, lithium sulfide ($Li_2S$ manufactured by Nippon Chemical Industrial Co., LTD.), and diphosphorus pentasulfide ($P_2S_5$ manufactured by Sigma-Aldrich Co. LLC.) were used. Powders of $Li_2S$ and $P_2S_5$ were mixed in glove box set to an argon atmosphere in a molar ratio of $Li_2S:P_2S_5$=75:25. Put into a container (45 cc, formed from $ZrO_2$) of a planetary ball mill were 2 g of the resultant mixture, dehydrated heptane (an amount of moisture was 30 ppm or less, 4 g), $ZrO_2$ balls ($\phi$=5 mm, 53 g), and then the container was completely closed (argon atmosphere). The container was mounted on a planetary ball milling machine (P7™ manufactured by Fritsch Japan Co., Ltd.), and mechanical milling (treatment for one hour, and stoppage for 15 minutes) was performed 40 times at the table rotation number of 500 rpm. Next, drying was performed under conditions at 100° C. for one hour so as to remove the heptane. According to this, sulfide solid electrolyte particles (sulfide glass) having a composition of $75Li_2S.25P_2S_5$ was obtained. Incidentally, the sulfide solid electrolyte particles correspond to the above-described sulfide solid electrolyte particles B.

(Manufacturing of Evaluation Battery 2)

The sulfide solid electrolyte particles ($D_{50}$=0.8 μm) that was obtained, a cathode active material ($LiCoO_2$, $D_{50}$=5 μm, manufactured by TODAKOGYO CORP.), and a conductive material (VGCF, $D_{50}$=1 μm) were prepared. Mixing was performed in a ratio in which the sulfide solid electrolyte particles were set to 304.2 mg, the cathode active material was set to 180.7 mg, and the conductive material was set to 15.1 mg, thereby obtaining a cathode mix. An evaluation battery (Evaluation Battery 2) was obtained in the same manner as in Example 1 except that the cathode mix that was obtained was used)

Comparative Examples 3 and 4

Evaluation Batteries 2 were obtained in the same manner as Comparative Example 2 except that the amount of the cathode mix was changed to values illustrated in Table 2.

Comparative Example 5

(Manufacturing of Sulfide Solid Electrolyte Particles)

As starting raw material, lithium sulfide ($Li_2S$ manufactured by Nippon Chemical Industrial Co., LTD.), diphosphorus pentasulfide ($P_2S_5$ manufactured by Sigma-Aldrich Co. LLC.), and lithium iodide (LiI manufactured by Sigma-Aldrich Co. LLC.) were used. Powders of $Li_2S$, $P_2S_5$, and LiI were mixed in a composition ratio of $20LiI.80(0.75Li_2S.0.25P_2S_5)$ in a glove boxy set to an argon atmosphere. Put into a container (45 cc, formed from $ZrO_2$) of a planetary ball mill were 2 g of the resultant mixture, dehydrated heptane (an amount of moisture was 30 ppm or less, 4 g), $ZrO_2$ balls ($\phi$=5 mm, 53 g), and then the container was completely closed (argon atmosphere). The container was mounted on a planetary ball milling machine (P7™ manufactured by Fritsch Japan Co., Ltd.), and mechanical milling (treatment for one hour, and stoppage for 15 minutes) was performed 40 times at the table rotation number of 500 rpm. Next, drying was performed under conditions at 100° C. for one hour so as to remove the heptane. According to this, sulfide solid electrolyte particles (sulfide glass) having a composition of $20LiI.80(0.75Li_2S.0.25P_2S_5)$ was obtained. Incidentally, the sulfide solid electrolyte particles correspond to the above-described sulfide solid electrolyte particles B.

(Manufacturing of Evaluation Battery 3)

The sulfide solid electrolyte particles ($D_{50}$=1 μm) that was obtained, a cathode active material ($LiCoO_2$, $D_{50}$=5 μm, manufactured by TODAKOGYO CORP.), and a conductive material (VGCF, $D_{50}$=1 μm) were prepared. Mixing was performed in a ratio in which the sulfide solid electrolyte particles were set to 457.4 mg, the cathode active material was set to 32.0 mg, and the conductive material was set to 10.7 mg, thereby obtaining a cathode mix. An evaluation battery (Evaluation Battery 3) was obtained in the same manner as in Example 1 except that the cathode mix that was obtained was used.

Comparative Examples 6 and 7

Evaluation Batteries 3 were obtained in the same manner as in Comparative Example 5 except that the amount of the cathode mix was changed to values illustrated in Table 2.

[Evaluation]

(Measurement of Li Ion Conductivity)

Li ion conductivity κ at 25° C. was measured by using the sulfide solid electrolyte particles which were obtained in Example 1, and Comparative Examples 2 and 5. First, 200 mg of the sulfide electrolyte particles was weighed and was put into a cylinder (manufactured by Macol), and was pressed therein at a pressure of 4 ton/cm². Both ends of a pallet that was obtained were pinched by an SUS pin, and a restriction pressure was applied to the pallet through bolt fastening, thereby obtaining an evaluation cell. The Li ion conductivity was calculated by an AC impedance method in a state in which the evaluation cell was retained at 25° C. During the measurement, Solartron 1260™ was used, and an application voltage was set to 5 mV, and a measurement frequency range was set to 0.01 MHz to 1 MHz. The results are shown in Table 1.

(Effective Li Ion Conductivity of Cathode Active Material Layer)

A volume fraction $\epsilon$ of the sulfide solid electrolyte particles in the cathode active material layer was obtained from the composition ratio of the cathode mix. The effective Li ion conductivity κ' of the cathode active material layer was calculated from values of $\epsilon$ and κ ($\kappa'=\kappa \times \epsilon^{1.5}$). The results are shown in Table 1.

(Effective Thickness and Actual Thickness)

The effective thickness "t" of the cathode active material layer in a case where the operation voltage width V was set to 1 (V) and the current density "i" was set to 15 mA/cm² was calculated from the value of κ' (t=V/i×κ'). The results are shown in Table 1. In addition, the actual thickness "T" of the cathode active material layer was obtained by a film thickness measuring device. The results are shown in Table 2.

(Charging and Discharging Test)

A charging and discharging test was performed with respect to Evaluation Batteries 1 to 3 which were obtained. Specifically, CCCV charging (0.1 mA/cm² cut) was performed up to 4.1 V at a current density of 0.5 mA/cm². Then, constant current discharging was performed up to 3.1 V at a constant current of 15 mA/cm² (operation voltage width V=1 (V)). Discharging capacity $\rho_0$ at that time was obtained. The effective capacity density $\rho$ was calculated by dividing the obtained value of $\rho_0$ by the volume of the cathode active material layer (actual thickness T×cross-sectional area S) ($\rho_0$/TS). The results are shown in Table 2 and FIG. 5.

TABLE 1

|  |  | Ion Conductivity κ (S/cm) of solid electrolyte | Volume fraction ε (%) of solid electrolyte | Effective Li ion conductivity κ' (S/cm) of cathode active material layer | Operation voltage width V (V) | Current density i (mA/cm$^2$) | Effective thickness t (μm) |
|---|---|---|---|---|---|---|---|
| Battery 1 | Example 1 | 0.008 | 60 | 0.00372 | 1 | 15 | 2478.71 |
|  | Example 2 | 0.008 | 60 | 0.00372 | 1 | 15 | 2478.71 |
|  | Example 3 | 0.008 | 60 | 0.00372 | 1 | 15 | 2478.71 |
|  | Example 4 | 0.008 | 60 | 0.00372 | 1 | 15 | 2478.71 |
|  | Comparative Example 1 | 0.008 | 60 | 0.00372 | 1 | 15 | 2478.71 |
| Battery 2 | Comparative Example 2 | 0.0006 | 60 | 0.000279 | 1 | 15 | 185.90 |
|  | Comparative Example 3 | 0.0006 | 60 | 0.000279 | 1 | 15 | 185.90 |
|  | Comparative Example 4 | 0.0006 | 60 | 0.000279 | 1 | 15 | 185.90 |
| Battery 3 | Comparative Example 5 | 0.003 | 15 | 0.000174 | 1 | 15 | 116.19 |
|  | Comparative Example 6 | 0.003 | 15 | 0.000174 | 1 | 15 | 116.19 |
|  | Comparative Example 7 | 0.003 | 15 | 0.000174 | 1 | 15 | 116.19 |

TABLE 2

|  |  | Effective thickness t (μm) | Cathode mix (mg) | Actual thickness T (μm) | T/t | Discharging capacity $\rho_0$ (mAh) | Effective capacity density ρ (mAh/μL) |
|---|---|---|---|---|---|---|---|
| Battery 1 | Example 1 | 2478.71 | 8 | 27 | 0.011 | 0.448 | 0.166 |
|  | Example 2 | 2478.71 | 32 | 108 | 0.044 | 2.13 | 0.197 |
|  | Example 3 | 2478.71 | 64 | 216 | 0.087 | 4.56 | 0.211 |
|  | Example 4 | 2478.71 | 113 | 368 | 0.148 | 6.63 | 0.180 |
|  | Comparative Example 1 | 2478.71 | 227 | 721 | 0.291 | 6.93 | 0.0960 |
| Battery 2 | Comparative Example 2 | 185.90 | 8 | 34 | 0.183 | 0.340 | 0.0999 |
|  | Comparative Example 3 | 185.90 | 32 | 110 | 0.592 | 0.415 | 0.0377 |
|  | Comparative Example 4 | 185.90 | 64 | 219 | 1.18 | 3.390 | 0.0178 |
| Battery 3 | Comparative Example 5 | 116.19 | 20 | 45 | 0.387 | 0.141 | 0.0314 |
|  | Comparative Example 6 | 116.19 | 40 | 90 | 0.775 | 0.386 | 0.0429 |
|  | Comparative Example 7 | 116.19 | 60 | 108 | 0.930 | 0.386 | 0.0357 |

Figure 5:
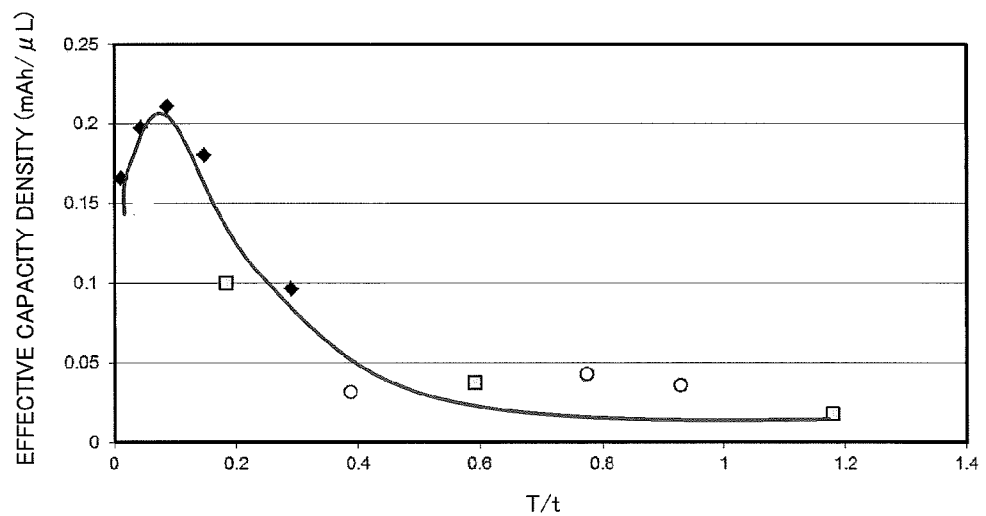
FIG. 5 is a view illustrating an effective capacity density of evaluation batteries obtained in Examples 1 to 4, and Comparative Examples 1 to 7.

As illustrated in Table 1, Table 2, and FIG. 5, it was confirmed that the effective capacity density is high in a case where T/t is in a predetermined range. In addition, even when changing the kind of the sulfide solid electrolyte particles or the amount thereof, the same tendency was confirmed.

REFERENCE SIGNS LIST

1: Cathode active material layer
2: Anode active material layer
3: Solid electrolyte layer
4: Cathode current collector
5: Anode current collector
6: Battery case
10: All solid state battery
11: Discharging control unit
20: All solid state battery system

What is claimed is:
1. An all solid state battery system, comprising:
an all solid state battery including a cathode active material layer, an anode active material layer, and a solid electrolyte layer that is formed between the cathode active material layer and the anode active material layer; and
a discharging control unit that controls discharging of the all solid state battery,
wherein the cathode active material layer contains a cathode active material particle, and a sulfide solid electrolyte particle, and
a ratio (T/t) of an actual thickness "T" of the cathode active material layer to an effective thickness "t" of the cathode active material layer which is calculated by the following Expression satisfies a relationship of 0.01≤T/t≤0.15;

$$t = V/i \times \kappa'$$

(in which, V represents an operation voltage width (V), i represents a current density (mA/cm$^2$) during discharging, and $\kappa'$ represents effective Li ion conductivity (S/cm) of the cathode active material layer).

2. The all solid state battery system according to claim 1, wherein the ratio (T/t) satisfies a relationship of $0.04 \leq T/t \leq 0.15$.

* * * * *